(12) United States Patent
Benoit et al.

(10) Patent No.: US 7,240,880 B2
(45) Date of Patent: Jul. 10, 2007

(54) HOLDING CLIP

(75) Inventors: Thomas A. Benoit, Bourbannais, IL (US); David A. Shereyk, Homewood, IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/845,602

(22) Filed: May 13, 2004

(65) Prior Publication Data

US 2005/0253025 A1 Nov. 17, 2005

(51) Int. Cl.
*F16L 3/08* (2006.01)

(52) U.S. Cl. .................. 248/65; 248/67.7; 24/555

(58) Field of Classification Search .......... 248/71, 248/73, 74.1, 74.2, 65, 67.7, 70; 24/457, 24/458, 551, 552, 553, 555, 559, 545

See application file for complete search history.

(56) References Cited

U.S. PATENT DOCUMENTS

| | | | |
|---|---|---|---|
| 719,462 A * | 2/1903 | Gysling ................ 24/559 |
| 1,585,840 A * | 5/1926 | Fahnestock ........... 439/828 |
| D204,159 S * | 3/1966 | Plasecki ............... D8/395 |
| 3,515,363 A * | 6/1970 | Fisher .................. 248/71 |
| 3,944,177 A | 3/1976 | Yoda .................. 248/74 A |
| 4,023,758 A | 5/1977 | Yuda .................. 248/73 |
| 4,291,855 A * | 9/1981 | Schenkel et al. ...... 248/74.1 |
| 4,437,633 A | 3/1984 | Andre ................ 248/68 R |
| 4,470,179 A | 9/1984 | Gollin et al. ........... 24/543 |
| 4,566,660 A * | 1/1986 | Anscher et al. ....... 248/74.2 |
| D293,205 S * | 12/1987 | Nakano ................ D8/395 |
| 4,762,296 A * | 8/1988 | Kraus et al. .......... 248/74.2 |
| 4,840,334 A * | 6/1989 | Kikuchi ............... 248/73 |
| 4,890,805 A * | 1/1990 | Morita ................ 248/74.2 |
| 4,917,340 A * | 4/1990 | Juemann et al. ....... 248/74.2 |
| 5,039,040 A | 8/1991 | Idjakiren ............. 248/73 |
| 5,129,607 A | 7/1992 | Satoh ................. 248/73 |
| 5,261,145 A * | 11/1993 | Jennings .............. 24/20 R |
| 5,271,158 A | 12/1993 | Chen ................. 30/508 |
| 5,271,587 A | 12/1993 | Schaty et al. ......... 248/68.1 |
| 5,535,969 A | 7/1996 | Duffy, Jr. ............. 248/68.1 |
| 5,639,049 A * | 6/1997 | Jennings et al. ....... 248/74.2 |
| 5,704,573 A | 1/1998 | de Beers et al. ....... 248/73 |
| 5,765,787 A | 6/1998 | de Beers et al. ....... 248/73 |
| 6,216,987 B1 | 4/2001 | Fukuo ................ 248/74.2 |
| 6,220,554 B1* | 4/2001 | Daoud ................ 248/74.1 |
| 6,371,419 B1 | 4/2002 | Ohnuki .............. 248/74.2 |
| 6,460,813 B1* | 10/2002 | Gretz ................. 248/62 |

* cited by examiner

*Primary Examiner*—A. Joseph Wujciak, III
(74) *Attorney, Agent, or Firm*—Mark W. Croll; Paul F. Donovan

(57) ABSTRACT

A holding clip for tubes, hoses and the like has a pocket and deflectable arms protecting an entrance to the pocket. The arms extend one past another and interdigitate one with another. The arms deflect outwardly in response to force exerted thereagainst from outside of the pocket and interengage one against another to resist force exerted thereagainst from within the pocket.

16 Claims, 1 Drawing Sheet

HOLDING CLIP

FIELD OF THE INVENTION

The present invention relates holders or clips used for routing items such as pipes, tubes, wires and the like, and, more particularly, the invention pertains to holders having an enclosed pocket for securing the items routed thereto while reducing the potential for accidental dislodgement from the holder.

BACKGROUND OF THE INVENTION

Holding devices of various types are known for routing items such as tubes, pipes, wires, rods and the like in a variety of applications, including the routing of hoses, tubes and wires in automobiles. The holding device commonly includes some type of anchoring fixture for securing the holding device to the article on which it is used. The anchoring fixture can be a threaded part, a compressible clip for inserting into a hole, a mounting plate with holes for bolts, screws, rivets or the like, or any of a variety of other constructions that can be used to attach the holding device to the article, such as, for example, an automobile. The holding device further includes a holding part or pocket that holds the pipe, tube, rod, wire or other item or thing to be held thereby.

Such holding devices are used extensively in the automotive industry for routing brake lines, fuel lines, HVAC lines and other similar items. The retainer must be robust to secure the item in place. Once inserted into the retainer, the item must be held firmly to prevent accidental dislodgement. A loose line or hose in an automobile can fail prematurely from mechanical stress placed thereon from movement and vibration resulting from its loosened condition.

A variety of designs are known for holding clips in automobiles. It is known to provide a pocket with a restricted inlet slightly narrower than the hose or tube diameter, requiring the hose or tube to be forced into the pocket. Some designs are known to include deflectable members at the top of the retention pocket, which can be deflected as the tube or hose is inserted. Once the tube or hose is properly positioned in the pocket, the arms spring back over the inlet area to the pocket. These designs are often referred to as "rabbit ear" designs because of the appearance of the deflectable arms. Both single rabbit ear and double rabbit ear constructions are known. A single rabbit ear design has an arm extending from one side of the inlet past the tube or pocket centerline. Such "over center" designs have had some success in holding tubes and hoses in place, but can be deflected to release the hose or tube if significant force is applied as the hose or tube is pulled from the pocket. So called "double rabbit ear" designs are intended to retain a tube or hose in the retention member via tangential force on the outer tube surface. These designs have opposed arms extending inwardly near to but not past the tube or pocket centerline. Again, sufficient pull out force can cause dislodgement of the tube or hose from the holder.

What is needed in the art is a holder for tubes, hoses and the like that adequately holds the item therein while substantially reducing the potential for unintended dislodgement, yet which can be manufactured inexpensively and used efficiently.

SUMMARY OF THE INVENTION

The present invention provides a holder or clip having a double over center rabbit ear design that substantially reduces the potential for unintended dislodgement of a tube, hose or similar item held within the retention member.

In one aspect thereof, the present invention provides a holding clip with a partially enclosed pocket having open ends and an inlet defined between opposed edges extending from one end to an opposite end. First and second arms project toward each other from opposite sides of the inlet. Distal ends of the arms are configured to interdigitate one with another and to interengage one against another in response to force exerted thereagainst from within the pocket.

In another aspect thereof, the present invention provides A holding clip with a monolithic body including an anchoring part for securing the clip to an article on which it is used and a holding part for retaining an item to be held thereby. The holding part includes at least one partially enclosed pocket having open ends and an inlet defined between opposed edges extending from one end of the pocket to the opposite end of the pocket. First and second arms are provided on opposite sides of the inlet. Each the arm includes a base segment extending outwardly from the pocket and a deflectable segment extending from the base segment toward the pocket and the other arm. The deflectable segments each have distal ends configured to interdigitate one with another and to interengage one against another in response to force exerted thereagainst from within the pocket.

In a further aspect thereof, the present invention provides a holding clip with a partially enclosed pocket having first and second open ends and an inlet defined between opposed edges extending from one end to the other end of the pocket. First and second arms project from the pocket and defining an entrance to the pocket. The arms having distal ends extending one past the other outwardly of the inlet. The arms are configured and arranged to deflect away from each other inwardly in response to force exerted thereagainst from outside of the pocket and to interengage one against another in response to force exerted thereagainst from within the pocket.

An advantage of the present invention is providing multiple over center retention arms to retain a tube in a pocket of a holder.

Another advantage of the present invention is providing a holder with retaining arms that interlock to increase potential pull out force needed for dislodging an item held by the holder.

A further advantage of the present invention is providing a holder design that is robust, yet does not require complicated tooling for manufacture, installation or use.

A still further advantage of the present invention is providing a basic holder design that can be modified for use in different applications requiring different retention strength for resisting pull out force.

Other features and advantages of the invention will become apparent to those skilled in the art upon review of the following detailed description, claims and drawings in which like numerals are used to designate like features.

Figure 1:
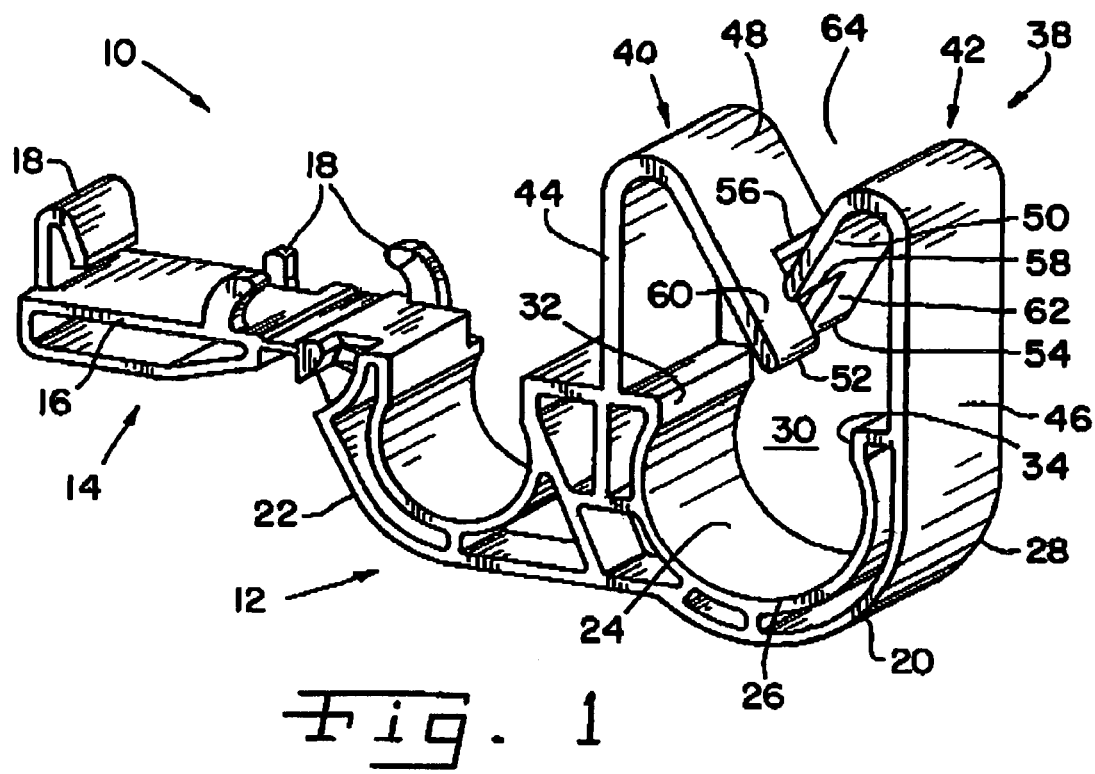
FIG. 1 is a perspective view of a first embodiment of a holder in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, numeral 10 designates a retaining device or holder in the nature of a hose clip 10 with a holding part 12 thereof configured in accordance with the present invention. Clip 10 is a monolithic body of relatively rigid plastic material, such as nylon, forming an anchoring part 14 and holding part 12.

Those skilled in the art will understand readily that clip 10 of the present invention can be configured for holding a variety of items, such as, but not limited to, brake lines, tubes, wires and the like. Further, clip 10 of the present invention can be configured for attachment to a variety of different articles, such as, but again not limited to automobiles, or different areas on the articles such as the fire, body or other parts of an automobile. In that regard, the particular configuration of anchor part 14 and holding part 12 shown and to be described herein are merely exemplary of a suitable application and use of the present invention. The particular configuration of anchor part 14 for attachment to different articles, and of holding part 12 with respect to the items to be held therein should not be viewed as limiting of the present invention.

Anchor part 14, as shown, includes a leg 16 extending outwardly for attachment to an article on which clip 10 is used. Leg 16 can include a variety of tabs 18 or the like for securing leg 16 in a hole or other receiving member. Those skilled in the art will understand readily that anchor part 14 can also be configured as a threaded stud, or as a plate with holes for receiving bolts, rivets, screws and the like for securing clip 10 in place. Still other configurations for anchor part 14 can be provided for attaching clip 10 to the article on which it is used.

Holding part 12 defines a holding area or pocket 20, 22 adjacent anchor part 14, and may include two or more pockets 20, 22. Two such pockets 20, 22 are illustrated in the drawings, one pocket 20 configured in accordance with the present invention, and the other pocket 22 configured in accordance with known designs. It should be understood that on a single holder 10, several or all pockets 20, 22 can be configured in accordance with the present invention, as will be described hereinafter. Further, the relationship between holding part 12 and pockets 20, 22 thereof and anchor part 14 can differ for different applications of the present invention. For example, two pockets 20, 22 may be provided on the same side of an anchor part 14 as shown, or pockets 20, 22 may be provided on opposite sides of anchor part 14.

Pocket 20 defines a space 24 for holding the item or items to be held therein. In the exemplary embodiment, pocket 20 is a partial substantially cylindrical body having open ends 26 and 28 through which the item or items to be held, such as a brake line, can extend. While shown as substantially round, pocket 20 and space 24 defined thereby can be of other shapes, such as oval, rectangular or complex geometric shapes, depending on the intended use for clip 10 and the shapes and numbers of items to be held therein.

Pocket 20 is slightly greater than semicylindrical, and has an inlet 30 thereto defined between spaced, opposed edges 32, 34 that are spaced from each other a distance slightly less than the diameter of a tube or hose (not shown) to be held within pocket 20. Edges 32, 34 extend from one end 26 to the opposite end 28 of pocket 20. In this way, once fully seated within pocket 20, the hose or tube is held therein by opposed edges 32, 34.

A super structure 38, including arms 40, 42 is disposed outwardly of inlet 30 and provides restricted access to inlet 30 of pocket 20. Arms 40, 42 include base segments 44, 46, respectively, and inwardly angling deflectable segments 48 and 50, respectively. Deflectable segments 48 and 50 project toward each other and have distal ends 52, 54, respectively, configured in a manner such that each deflectable segment 48, 50 is an over-center segment extending from its respective base segment 44, 46 past the center line of pocket 20. Thus, distal ends 52, 54 are configured to interdigitate one with the other and to interengage one against the other to resist pullout, as will be further described hereinafter.

In the embodiment shown in FIG. 1, distal ends 52, 54 are mirror images of each other, each having a cutout 56, 58, respectively, from the outer ends thereof, such that distal ends 52, 54 overlap. Narrowed end segments 60, 62 adjacent cutouts 56, 58, respectively, extend past one another in the respective cutouts 58, 56 of the other deflectable segment 50, 48.

Thus, arms 40, 42 define a V-shaped inlet area 64 therebetween through which a hose, tube or the like (not shown) can be inserted. As a tube (not shown) is inserted into clip 10, the tube strikes one or more of retention arms 40, 42. The force applied against the tube or hose forces one or more of the arms 40, 42 to deflect outwardly away from the tube. As the tube continues down into the final tube seating area within pocket 20, the rabbit ear like structures of arms 40, 42 recoil back and rest over the center-line of the tube. Once the tube is fully seated, the tube is retained jointly by the narrowed inlet 30 to pocket 20 and the double over center structure of arms 40, 42. If pull out force is exerted against the tube or hose, the interdigitated distal ends 52, 54 having narrowed end segments 60, 62 thereof within cutouts 58, 56, respectively, interengage one with another, making pull out more difficult.

Pocket 22 is shaped similarly to pocket 20, having edges 66, 68 defining a restricted entrance thereto, for holding a hose, tube or the like (not shown). Pocket 22 is of known design for a hose clip, and therefore will not be described further herein.

Figure 2:
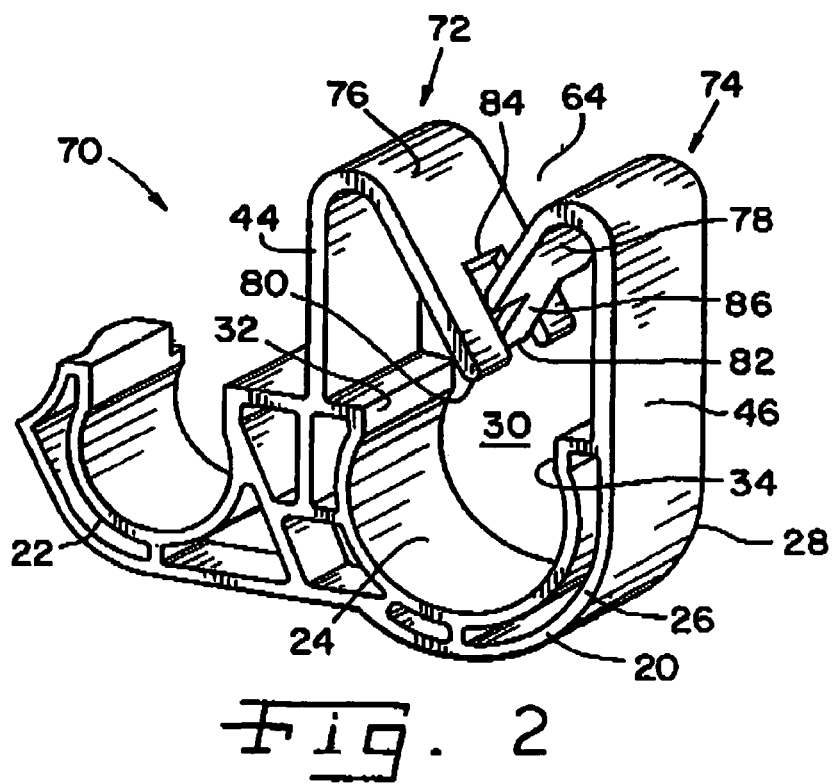
FIG. 2 is a perspective view of a second embodiment of a holder in accordance with the present invention.

FIG. 2 illustrates a second embodiment of the present invention. Clip 70 illustrated therein is similar in most respects to clip 10, and similar components thereof are numbered identically to clip 10. However, clip 70 includes arms 72, 74 having similar base segments 44, 46, respectively, but modified deflectable segments 76, 78. Specifically, distal ends 80, 82 thereof are not mirror images of each other as are distal ends 52, 54 of clip 10. Instead, one distal end 80 includes a centrally located slot 84 extending inwardly from the outer edge thereof. The other distal end 82 defines a narrowed centrally located finger 86 that extends into slot 84 when deflectable arms 72, 74 are in a relaxed state. Clip 70 functions similarly as described above for clip 10, whereby distal ends 80, 82 engage one with another if extraction force is exerted against a tube, hose or the like held within pocket 20 of clip 70.

Those skilled in the art will readily understand that other types of interengaging or interdigitating distal end portions can be provided on the arms of clip 10, allowing the arms to deflect inwardly away and past each other when a tube, hose or similar item is inserted into a pocket of the clip; while also interengaging each other to resist extraction of the hose, tube or the like when force is exerted from the inside toward the outside of the pocket. For example, multiple interdigitating slots 84 and fingers 86, or cutouts 56, 58 and narrowed end segments 60, 62 of other shapes can be used.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A holding clip comprising:
   a partially enclosed pocket having a first open end and a second open end spaced apart from said first open end, and an inlet defined between opposed edges extending between said first and second open ends, such that said inlet leads into said pocket past said edges, said pocket having a first dimension, and a second dimension defined between said opposed edges, said first dimension being substantially parallel with said second dimension wherein said first dimension is being U-shaped and said second dimension having projection part on both top ends of U-shaped; and said first dimension being greater than said second dimension;
   first and second arms projecting toward each other from opposite sides of said inlet to define a substantially V-shaped inlet area, said V-shaped inlet area spaced a distance from said opposed edges and outside said pocket; and
   distal ends of said arms configured to overlap one with another so that each extends past a center-line of said inlet and to interdigitate one with another in an initial state before an item is passed thereby, to deflect inwardly away from each other when subjected to an insertion force to allow the item to pass thereby, to interdigitate one with another once the item has passed and to interengage one against another in response to force exerted thereagainst from within said pocket, whereby said first and second arms remain substantially in said V-shaped inlet area before and after the item passes therethrough, each said distal end having a cutout on one side and a narrowed end segment adjacent cutout said distal ends being configured to be substantially identical to each other, with each said narrowed end segment received in the cutout of the other said distal end.

2. The clip of claim 1, each of said arms including a base segment extending outwardly from said inlet and a deflectable segment extending from said base segment toward said inlet.

3. The clip of claim 2, each said deflectable segment extending past said center-line of said inlet.

4. A holding clip comprising:
   a partially enclosed pocket having a first open end and a second open end spaced apart from said first open end, and an inlet defined between opposed edges extending between said first and second open ends, such that said inlet leads into said pocket past said edges, said pocket having a first dimension, and a second dimension defined between said opposed edges, said first dimension being substantially parallel with said second dimensions wherein said first dimension is being U-shaped and said second dimension having projection part on both top ends of U-shaped; and said first dimension being greater than said second dimension;
   first and second arms projecting toward each other from opposite sides of said inlet to define a substantially V-shaped area said V-shaped inlet area spaced a distance from said opposed edges and outside said pocket; and
   distal ends of said arms configured to overlap one with another so that each extends past a center-line of said inlet and to interdigitate one with another in an initial state before an item is passed thereby, to deflect inwardly away from each other when subjected to an insertion force to allow the item to pass thereby, to interdigitate one with force exerted thereagainst from within said pocket whereby said first and second arms remain substantially in said V-shaped inlet area before and after the item passes therethrough, one said distal end defining a slot and the other said distal end defining a finger received in said slot.

5. The clip of claim 4, each of said arms including a base segment extending outwardly from said inlet and a deflectable segment extending from said base segment toward said inlet.

6. The clip of claim 5, each said deflectable segment extending past said center-line of said inlet.

7. A holding clip comprising:
   a monolithic body including an anchoring part for securing said clip to an article on which it is used and a holding part for retaining an item to be held thereby, said holding part including:
   at least one partially enclosed pocket having spaced apart open ends and an inlet defined between opposed edges extending between said open ends, said inlet leading into said pocket past said edges, said pocket having a first dimension, and a second dimension defined between said opposed edges, said first dimension being substantially parallel with said second dimension, and said first dimension being greater than said second dimension wherein said first dimension is being U-shaped and said second dimension having projection part on both top ends of U-shaped; and
   first and second arms projecting from opposite sides of said inlet to define a substantially V-shaped inlet area, said V-shaped inlet area spaced a distance from said opposed edges and outside said packet, each said arm including a base segment extending outwardly from said pocket and a deflectable segment extending from the base segment toward the pocket and the other said arm, said deflectable segments each having distal ends configured to overlap and interdigitate one another so that each extends past a center-line of said inlet in an initial state before the item is caused to pass thereby, said distal ends being further configured to deflect inwardly away from each other when subjected to an insertion force to allow the item to pass thereby, to interdigitate one with another after the item has passed and to interengage one against another in response to force exerted thereagainst from within said pocket, whereby said first and second arms remain substantially in said V-shaped inlet area before and after the item passes therethrough, each said deflectable segment being of sufficient length to extend from its respective base segment to a point past said center-line of said inlet, and each said distal end having a cutout on one side and a narrowed end segment adjacent the cutout, said distal ends being configured to be substantially identical to each other, with each said narrowed end segment received in the cutout of the other said distal end.

8. The clip of claim 7, said pocket being substantially part cylindrical.

9. The clip of claim 8, said edges spaced from each other by a distance less than a diameter of said pocket.

10. The clip of claim 7, said deflectable segments forming at least a portion of said V-shaped inlet area therebetween.

11. A holding clip comprising:
a monolithic body including an anchoring part for securing said clip to an article on which it is used and a holding part for retaining an item to be held thereby, said holding part including:
at least one partially enclosed pocket having spaced apart open ends and an inlet defined between opposed edges extending between said open ends, said inlet leading into said pocket past said edges, said having a first dimension, and a second dimension defined between said opposed edges, said first dimension being substantially parallel with said second dimension, and said first dimension being greater than said second dimension wherein said first dimension is being U-shaped and said second dimension having projection part on both top ends of U-shaped; and
first and second arms projecting from opposite sides of said inlet to define a substantially V-shaped inlet area, said V-shaped inlet area spaced a distance from said opposed edges and outside said pocket, each said arm including a base segment extending outwardly from said pocket and a deflectable segment extending from the base segment toward the pocket and the other said arm, said deflectable segments each having distal ends configured to overlap and interdigitate one another so that each extends past a center-line of said inlet in an initial state before the item is caused to pass thereby, said distal ends being further configured to deflect inwardly away from each other when subjected to an insertion force to allow the item to pass thereby, to interdigitate one with another after the item has passed and to interengage one against another in response to force exerted thereagainst from within said pocket, whereby said first and second arms remain substantially in said V-shaped inlet area before and after the item passes therethrough, each said deflectable segment being of sufficient length to extend from its respective bases segment to a point past said center-line of said inlet, and one said distal end defining a slot and the other said distal end defining a finger received in said slot.

12. A holding clip comprising:
a partially enclosed pocket having first and second spaced apart open ends and an inlet defined between opposed edges extending between said open ends, such that said inlet leads into said pocket past said edges, said pocket having a first dimension, and a second dimension defined between said opposed edges, said first dimension being substantially parallel with said second dimension, and said first dimension being greater than said second dimension wherein said first dimension is being U-shaped and said second dimension having projection part on both top ends of U-shaped;
first and second arms projecting from said pocket in a substantially V-shape pattern and defining an entrance to said pocket, said V-shaped entrance spaced a distance from said opposed edges and outside said pocket, said arms having distal ends extending one past the other outwardly of said inlet past a centerline of said inlet so as to overlap and interdigitate one another in an initial state, said arms being configured and arranged to deflect away from each other inwardly in response to force exerted thereagainst from outside of said pocket and to interengage one against another in response to force exerted thereagainst from within said pocket, wherein said first and second arms are adapted to remain substantially in said V-shaped entrance area in said initial state and when subjected to force exerted thereagainst from within said pocket, one said distal end defining a slot and the other said distal end defining a finger received in said slot.

13. The clip of claim 12, said distal ends being substantially identical to each other.

14. The clip of claim 12, said entrance configured as a V-shaped area between portions of said arms.

15. The clip of claim 12, each said distal end extending from its respective said arm past said centerline of said inlet between said edges.

16. A holding clip comprising:
a partially enclosed pocket having first and second spaced apart open ends and an inlet defined between opposed edges extending between said open ends, such that said inlet leads into said pocket past said edges, said pocket having a first dimension, and a second dimension defined between said opposed edges, said first dimension being substantially parallel with said second dimension, and said first dimension being greater than said second dimension wherein said first dimension is being U-shaped and said second dimension having projection part on both top ends of U-shaped;
first and second arms projecting from said pocket in a substantially V-shape pattern and defining an entrance to said pocket, said V-shaped entrance spaced a distance from said opposed edges and outside said pocket, said arms having distal ends extending one past the other outwardly of said inlet past a centerline of said inlet so as to overlap and interdigitate one another in an initial state, said arms being configured and arranged to deflect away from each other inwardly in response to force exerted thereagainst from outside of said pocket and to interengage one against another in response to force exerted thereagainst from within said pocket, wherein said first and second arms are adapted to remain substantially in said V-shaped entrance area in said initial state and when subjected to force exerted thereagainst from within said pocket, said distal ends each having a cutout, and each distal end having a narrowed end segment received in the cutout of the other said distal end.

* * * * *